United States Patent
Li et al.

(10) Patent No.: US 10,564,177 B2
(45) Date of Patent: Feb. 18, 2020

(54) SYSTEM AND METHOD FOR USER ACTIVITY RECOGNITION USING ACCELEROMETER

(71) Applicant: Samsung Electronics Co., Ltd., Suwon-si, Gyeonggi-do (KR)

(72) Inventors: Xue Li, San Diego, CA (US); Linbo Li, San Diego, CA (US); Andrey Zobenko, Suwon (KR); Seongwook Song, Seoul (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 393 days.

(21) Appl. No.: 15/337,531

(22) Filed: Oct. 28, 2016

(65) Prior Publication Data
US 2018/0031605 A1    Feb. 1, 2018

Related U.S. Application Data

(60) Provisional application No. 62/369,705, filed on Aug. 1, 2016.

(51) Int. Cl.
*G01P 15/18* (2013.01)
(52) U.S. Cl.
CPC .................................... *G01P 15/18* (2013.01)
(58) Field of Classification Search
CPC ................................ G01P 13/00; G01P 15/18
See application file for complete search history.

(56) References Cited

U.S. PATENT DOCUMENTS

| 7,421,369 | B2 | 9/2008 | Clarkson |  |
|---|---|---|---|---|
| 8,930,300 | B2 | 1/2015 | Grokop et al. |  |
| 8,965,402 | B2 | 2/2015 | Vathsangam et al. |  |
| 2009/0303204 | A1* | 12/2009 | Nasiri | A63F 13/06 345/184 |
| 2010/0161271 | A1* | 6/2010 | Shah | A61B 5/112 702/141 |
| 2011/0201362 | A1* | 8/2011 | Bregman-Amitai | G06T 19/006 455/466 |
| 2012/0278024 | A1* | 11/2012 | Lee | G01P 21/00 702/87 |

(Continued)

*Primary Examiner* — John E Breene
*Assistant Examiner* — Yaritza H Perez Bermudez
(74) *Attorney, Agent, or Firm* — Renaissance IP Law Group LLP

(57) ABSTRACT

A system to recognize user activity includes a filter to form a gravity measurement from a three-dimensional (3D) accelerometer measurement of a user activity; a body component extractor to form a body measurement of the user activity by removing the gravity measurement from the 3D accelerometer measurement; a rotation matrix calculator to form a rotation matrix that is used to rotate the extracted gravity to align with a predetermined direction, and to rotate the 3D accelerometer measurements and the body measurement to be the input to features determiner module; and a features determiner to determine values of a predetermined number of features of the user activity based on the rotated 3D accelerometer measurement and the rotated body measurement in which the predetermined number of features are invariant under arbitrary rotation of the accelerometer measurement around the predetermined direction.

20 Claims, 4 Drawing Sheets

(56) References Cited

U.S. PATENT DOCUMENTS

| | | | |
|---|---|---|---|
| 2013/0015976 A1* | 1/2013 | Chang | A61B 5/0002 340/573.7 |
| 2013/0106697 A1* | 5/2013 | Kulik | G01C 17/38 345/158 |
| 2013/0179110 A1 | 7/2013 | Lee | |
| 2013/0332156 A1* | 12/2013 | Tackin | H04M 1/6041 704/226 |
| 2014/0038674 A1 | 2/2014 | Srinivasan et al. | |
| 2014/0065976 A1* | 3/2014 | Jones | H04W 4/027 455/67.11 |
| 2014/0188638 A1* | 7/2014 | Jones | H04W 4/60 705/16 |
| 2014/0267233 A1* | 9/2014 | Lee | G06F 1/1639 345/419 |
| 2015/0027226 A1* | 1/2015 | Turon | H04Q 9/00 73/504.04 |
| 2015/0143889 A1* | 5/2015 | Kim | E21B 47/024 73/152.59 |
| 2015/0168176 A1* | 6/2015 | Wu | G01C 25/005 702/150 |
| 2015/0287338 A1* | 10/2015 | Wells | G09B 19/0038 702/19 |
| 2015/0309195 A1* | 10/2015 | Sallas | G01V 1/005 367/49 |
| 2015/0317890 A1* | 11/2015 | Ten Kate | A61B 5/1117 702/141 |
| 2016/0007934 A1* | 1/2016 | Arnold | A61B 5/1123 600/595 |
| 2016/0010984 A1* | 1/2016 | Schwartz | G01P 13/02 702/151 |
| 2016/0178657 A9* | 6/2016 | Karahan | G01P 21/00 73/1.38 |
| 2016/0325756 A1* | 11/2016 | Cordova | G01P 21/00 |
| 2016/0327396 A1* | 11/2016 | Hallberg | G01C 21/165 |
| 2016/0349058 A1* | 12/2016 | Yu | H01Q 3/02 |
| 2017/0195834 A1* | 7/2017 | Na | G01S 5/0252 |
| 2017/0234686 A1* | 8/2017 | Zhao | G01C 21/16 702/150 |
| 2017/0285365 A1* | 10/2017 | Wada | G03B 5/00 |

* cited by examiner

SYSTEM AND METHOD FOR USER ACTIVITY RECOGNITION USING ACCELEROMETER

CROSS-REFERENCE TO RELATED APPLICATION

This patent application claims the priority benefit under 35 U.S.C. § 119(e) of U.S. Provisional Patent Application No. 62/369,705, filed on Aug. 1, 2016, the disclosure of which is incorporated herein by reference in its entirety.

TECHNICAL FIELD

The subject matter disclosed herein generally relates to user activity recognition, and more particularly, to an apparatus and method for orientation independent mobile user activity recognition based on accelerometer.

BACKGROUND

The performance of User Activity Recognition (UAR) devices may be significantly degraded due to an arbitrary sensor position and/or a sensor orientation that typifies real-world applications.

SUMMARY

An example embodiment provides a user activity recognizer that may include: a filter to form a gravity measurement from a three-dimensional (3D) accelerometer measurement of a user activity; a body component extractor to form a body measurement of the user activity by removing the extracted gravity measurement from the 3D accelerometer measurement; a rotation matrix calculator to form a rotation matrix R that is used to rotate and align the extracted gravity measurement with a predetermined direction, and to rotate the 3D accelerometer measurements and a body measurement to be the input to features determiner module.

An example embodiment provides a method to recognize user activity in which the method may include: filtering a three-dimensional (3D) accelerometer measurement of a user activity to form a gravity measurement; removing the extracted gravity measurement from the 3D accelerometer measurement to form a body measurement of the user activity by; rotating and aligning the extracted gravity measurement with a predetermined direction to using a rotation matrix R.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

Figure 1:
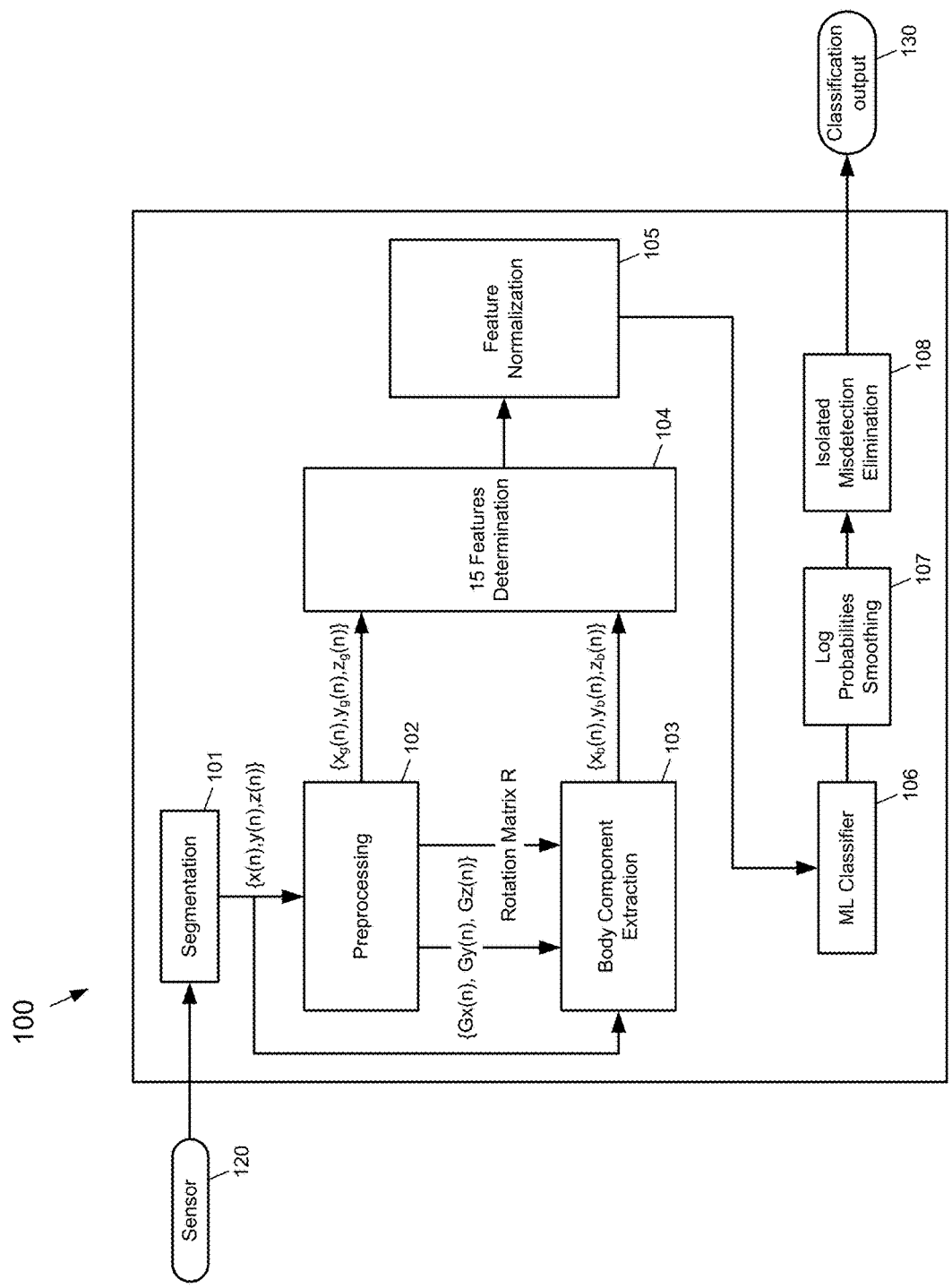
FIG. 1 depicts a functional block diagram of an example embodiment of a UAR system according to the subject matter disclosed herein.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing particular exemplary embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement the teachings of particular embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. The term "software," as applied to any implementation described herein, may be embodied as a software package, code and/or instruction set or instructions. The term "hardware," as applied to any implementation described herein, may include, for example, singly or in any combination, hardwired circuitry, programmable circuitry, state-machine circuitry, and/or firmware that stores instructions executed by programmable circuitry. The modules may, collectively or individually, be embodied as software, firmware and/or hardware that forms part of a larger system, such as, but not limited to, an integrated circuit (IC), system on-chip (SoC) and so forth.

The subject matter disclosed herein relates to a low-power UAR that provides robust user activity recognition regardless of accelerometer sensor position and/or orientation by extracting gravity measurement, forming body measurement by removing the extracted gravity from 3D accelerometer measurement, calculating a rotation matrix that is used to rotate the extracted gravity to align with a predetermined direction, and to rotate the 3D accelerometer measurements and a body measurement to be the input to features determiner module and using a plurality of features that are invariant under arbitrary rotation around a predetermined axis of the accelerometer to classify the measured user activity into one of a plurality of recognized activities. Additionally, a UAR according to the subject matter disclosed herein may be configured to have a low memory-size requirement. In one embodiment, a UAR according to the subject matter disclosed herein may be embodied as a mobile device, such as, but not limited to, a smartphone.

FIG. 1 depicts a functional block diagram of an example embodiment of a UAR system 100 according to the subject matter disclosed herein. In one embodiment, the UAR system 100 recognizes and classifies physical activity of a user into one of a plurality of activities for every data segment of an accelerometer output based on a set of features that are determined from the data. As depicted in FIG. 1, the UAR system 100 includes a segmentation module 101, a preprocessing module 102, a body component extractor module 103, a features determination module 104, a feature normalization module 105, a machine learning (ML) classifier module 106, a log probabilities smoothing module 107 and an isolated misdetection eliminator module 108. In one embodiment, the UAR system 100 may be embodied in a smartphone.

Figure 3:
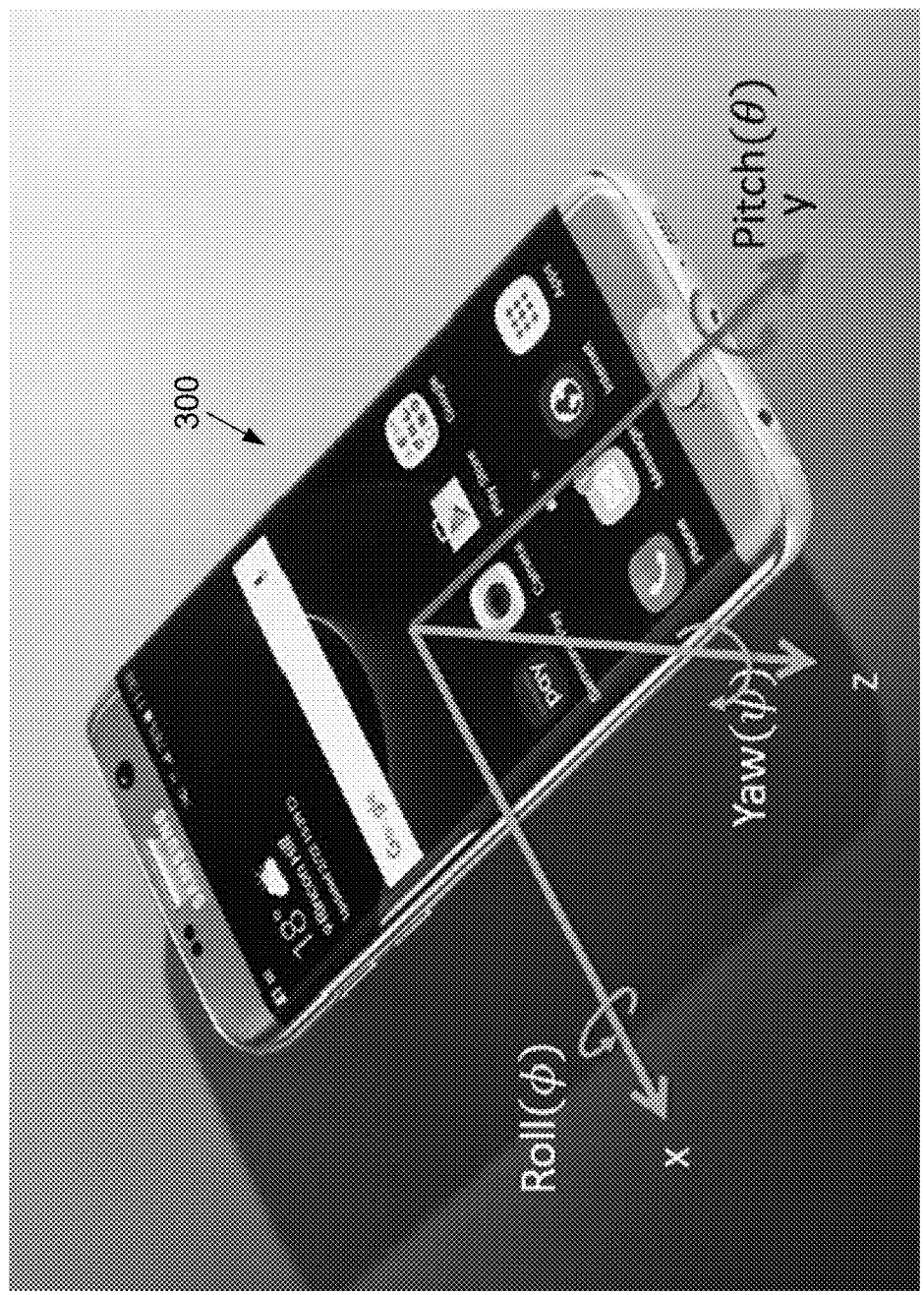
FIG. 3 depicts the directions of the three Cartesian axes of an example embodiment of a smartphone.

The segmentation module 101 receives three dimensional (3D) raw accelerometer data from a sensor 120. In one embodiment, the sensor 120 may be part of a 3D accelerometer platform that may be communicatively coupled to the UAR system 100. In another embodiment, the sensor 120 may be a 3D accelerometer that may be part of, but not limited to, a smartphone. In an embodiment in which the sensor 120 is part of a smartphone, the three Cartesian axes of the sensor 120 may be configured to align with the three Cartesian axes of a smartphone, such as indicated in FIG. 3.

In one embodiment, the segmentation module 101 resamples the raw accelerometer data at a 50 Hz sampling rate, and segments the resampled data into 3D 128-sample segments that have a 50% overlap with adjacent segments.

The preprocessing module 102 extracts a gravity vector from the sample segments and calculates a per-segment rotation matrix that can rotate the extracted gravity so that the average of the extracted gravity measurement always substantially aligns with the negative y-axis of, for example, a smartphone. In embodiments in which the accelerometer sensor platform is separate from or remotely located from the UAR 100, the preprocessing module 102 extracts the gravity vector from the sample segments and calculates the rotation matrix that can rotate the average of the extracted gravity measurement to always substantially align for a negative y-axis of the accelerometer sensor platform.

Figure 2:
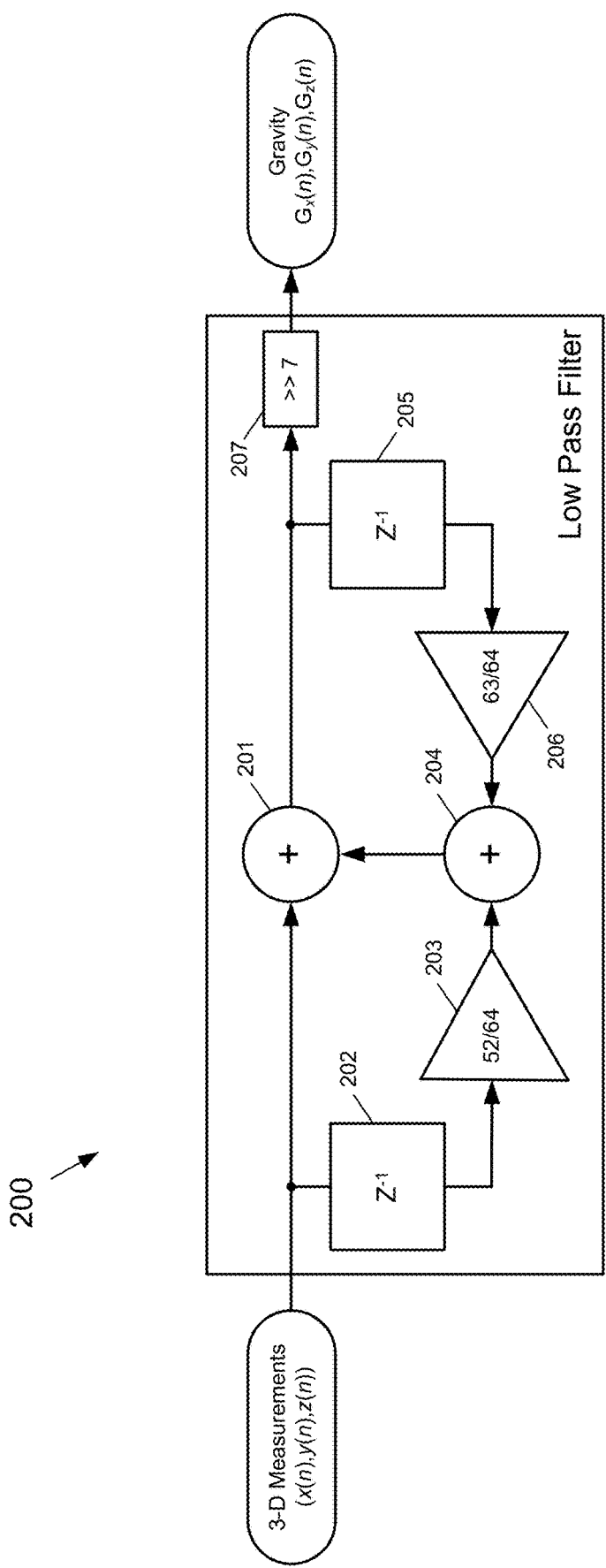
FIG. 2 depicts an example embodiment of a low pass filter that may be used to extract a low-frequency gravity vector from the 3D sample segments according to the subject matter disclosed herein.

In one embodiment, the preprocessing module 102 includes a low pass filter (LPF) that extracts the gravity vector from the sample segments. FIG. 2 depicts an example embodiment of a low pass filter 200 that may be used to extract a low-frequency gravity vector from the 3D sample segments according to the subject matter disclosed herein. In one embodiment, the low pass filter 200 may be a module that is separate from the preprocessing module 102. The input to the low pass filter 200 is the 3D measurements in one segment (x(n), y(n), z(n)), and the output is a low-frequency gravity vector $(G_x(n), G_y(n), G_z(n))$. A simple LPF may be used, which significantly reduces the amount of memory that is needed to extract gravity from the sample segments. For example, the low pass filter 200 may include a summer 201, a first delay 202, a scaler 203, a summer 204, a second delay 205, a scaler 206 and a bit shifter 207. The input x(n), y(n), z(n) is applied to the summer 201 and the first delay 202. The output of the first delay 202 is input to the scaler 203, which scales the input to the delay 202 by 52/64. The output of the scaler 203 is input to the summer 204. The output of the summer 201 is input to a second delay 205 and the bit shifter 207. The output of the second delay 205 is input to the scaler 206, which scales to the input to the delay 205 by 63/64. The output of the scaler 205 is input to the summer 204. The output of the summer 204 is input to the summer 201. In one embodiment, the bit shifter 207 will right shift with 7 bits for example.

As depicted in FIG. 2, the gravity extraction procedure from raw accelerometer measurements may be expressed as:

$$G_x(n) = \frac{x(n) + \frac{52}{64}x(n-1) + \frac{63}{64}G_x(n-1)}{128}$$

$$G_y(n) = \frac{y(n) + \frac{52}{64}y(n-1) + \frac{63}{64}G_y(n-1)}{128}$$

$$G_z(n) = \frac{z(n) + \frac{52}{64}z(n-1) + \frac{63}{64}G_z(n-1)}{128}$$

The measured accelerometer output in each segment may be rotated using the rotation matrix calculated based on the extracted 3D gravity vector so that the rotated extracted gravity in each segment is substantially aligned the negative y-axis of a smartphone (or sensor platform). FIG. 3 depicts the directions of the three Cartesian axes of an example embodiment of a smartphone 300. As depicted in FIG. 3, the negative y-axis of the example embodiment of a smartphone corresponds to the head of the smartphone pointing towards the ground (i.e., towards the center of the Earth). Using $G_x(n)$, $G_y(n)$, $G_z(n)$ to denote the 3D extracted low-frequency gravity vector output from the LPF, in which n is an index of the total number of samples N in a segment (i.e., n=1, 2, . . . , N, and N=128), the averaged gravity components are $$\overline{G_x} = \frac{1}{N}\sum_{n=1}^{N} G_x(n),$$

$$\overline{G_y} = \frac{1}{N}\sum_{n=1}^{N} G_y(n),$$

$$\overline{G_z} = \frac{1}{N}\sum_{n=1}^{N} G_z(n).$$

In one embodiment, the preprocessing module 102 generates a rotation matrix R that may be used to rotate the extracted gravity vector so that the extracted gravity vector will be aligned substantially along the negative of y-axis. That is, $$\begin{bmatrix} 0 \\ -\sqrt{\overline{G_x}^2 + \overline{G_y}^2 + \overline{G_z}^2} \\ 0 \end{bmatrix} = R \begin{bmatrix} \overline{G_x} \\ \overline{G_y} \\ \overline{G_z} \end{bmatrix}.$$

All of the 3D global accelerometer measurements x(n), y(n), z(n) in a segment are rotated as $x_g(n)$, $y_g(n)$, $z_g(n)$:

$$\begin{bmatrix} x_g(n) \\ y_g(n) \\ z_g(n) \end{bmatrix} = R \begin{bmatrix} x(n) \\ y(n) \\ z(n) \end{bmatrix},$$

in which x(n), y(n), z(n) are the raw accelerometer measurement components.

The rotation matrix R is based on two angles ψ and ϕ, indicated in FIG. 3, and are respectively the rotation angles around z-axis and x-axis. Angles ψ and ϕ may be expressed as $$\psi = \frac{\pi}{2} + \text{atan2}(\overline{G_y}, \overline{G_x}),$$

$$\phi = \frac{\pi}{2} + \text{atan2}(-\overline{G_x}\cdot\sin(\psi) + \overline{G_y}\cdot\cos(\psi), -\overline{G_z}),$$

in which $$\text{atan2}(y, x) = \begin{cases} \arctan\left(\frac{y}{x}\right), & \text{if } x > 0 \\ \arctan\left(\frac{y}{x}\right) + \pi, & \text{if } x < 0 \text{ and } y \geq 0 \\ \arctan\left(\frac{y}{x}\right) - \pi, & \text{if } x < 0 \text{ and } y < 0 \\ +\frac{\pi}{2}, & \text{if } x = 0 \text{ and } y > 0 \\ -\frac{\pi}{2}, & \text{if } x = 0 \text{ and } y < 0 \\ \text{undefined}, & \text{if } x = 0 \text{ and } y = 0 \end{cases}$$

The rotation matrix R may be expressed as $$R = \begin{bmatrix} \cos(\psi) & \sin(\psi) & 0 \\ -\cos(\varphi)\sin(\psi) & \cos(\varphi)\cos(\psi) & \sin(\varphi) \\ \sin(\varphi)\sin(\psi) & -\sin(\varphi)\cos(\psi) & \cos(\varphi) \end{bmatrix}.$$

Returning to FIG. 1, the body component extraction module 103 determines the components of a body vector by removing the low-frequency gravity vector output, which is from the preprocessing module 102, from the accelerometer measurement vector. In one embodiment, the body component extraction module 103 calculates the rotated body vector components $x_b(n)$, $y_b(n)$, $z_b(n)$ by subtracting the extracted gravity from the 3D accelerometer measurements and rotating the results by the rotation matrix R, which will be the input to the features determiner module, and may be expressed as:

$$\begin{bmatrix} x_b(n) \\ y_b(n) \\ z_b(n) \end{bmatrix} = \begin{bmatrix} x_g(n) \\ y_g(n) \\ z_g(n) \end{bmatrix} - R\begin{bmatrix} G_x(n) \\ G_y(n) \\ G_z(n) \end{bmatrix} = R\left(\begin{bmatrix} x(n) \\ y(n) \\ z(n) \end{bmatrix} - \begin{bmatrix} G_x(n) \\ G_y(n) \\ G_z(n) \end{bmatrix}\right).$$

The rotated 3D accelerometer measurement and the rotated body vector components are used by the features determination module 104 to generate feature values corresponding to the measured activity are invariant under an arbitrary rotation around the y-axis of a smartphone (or sensor platform), thereby providing robust user activity recognition.

The feature determination module 104 determines features values for each segment that are used to classify the user activity. Mathematical formulations of an example set of 15 features used by the feature determination module 104 to generate feature values are set forth in Table 1. In another embodiment, a different set of features may be used by feature determination module 104 to generate feature values. As used herein, components x(n), y(n), z(n) are the raw accelerometer measurement components, components $x_g(n)$, $y_g(n)$, $z_g(n)$ are the rotated 3D global accelerometer measurements components that are output from the preprocessing module 102, and components $x_b(n)$, $y_b(n)$, $z_b(n)$ are the rotated body vector components, and are related as $$\begin{bmatrix} x_b(n) \\ y_b(n) \\ z_b(n) \end{bmatrix} = \begin{bmatrix} x_g(n) \\ y_g(n) \\ z_g(n) \end{bmatrix} - R\begin{bmatrix} G_x(n) \\ G_y(n) \\ G_z(n) \end{bmatrix} = R\left(\begin{bmatrix} x(n) \\ y(n) \\ z(n) \end{bmatrix} - \begin{bmatrix} G_x(n) \\ G_y(n) \\ G_z(n) \end{bmatrix}\right),$$

in which R and $G_x(n)$, $G_y(n)$, $G_z(n)$ are respectively the rotation matrix and extracted gravity vector components output from the low pass filter 200 in FIG. 2.

TABLE 1

Predetermined Features used by the Features Determination Module 104

$$\text{STD on } \sqrt{|x_g(n)|^2+|z_g(n)|^2}$$

$$\text{STD on } y_g(n)$$

$$\text{Max}(y_g(n)) - \text{Min}(y_g(n))$$

$$\frac{1}{N}\sum_{n=0}^{N-1}(|y_g(n) - \overline{y_g}|)$$

$$\frac{1}{N}\sum_{n=0}^{N-1}\sqrt{|x_g(n)|^2+|y_g(n)|^2+|z_g(n)|^2}$$

$$\frac{\text{Max}(y_g(n))}{\text{STD of }(\text{atan2}(y_g(n), \sqrt{|x_g(n)|^2+|z_g(n)|^2}))}$$

$$\text{Mean}(y_b(n))$$

$$\text{Prob}\{y_b(n) \leq \min(y_b(n)) + 0.1 * (\max(y_b(n)) - \min(y_b(n)))\}$$

$$\frac{1}{N}\sum_{n=0}^{N-1}(|x_b(n) - \overline{x_b}|^2) + \frac{1}{N}\sum_{n=0}^{N-1}(|z_b(n) - \overline{z_b}|^2)$$

$$\frac{1}{N}\sum_{n=0}^{N-1}\sqrt{|x_b(n)|^2+|y_b(n)|^2+|z_b(n)|^2}$$

$$\frac{\text{Max }(y_b(n))}{\text{STD of }(\text{atan2}(y_b(n), \sqrt{|x_b|^2+|z_b|^2}))}$$

$$\frac{1}{N}\sum_{n=0}^{N-1}\left(\left|\frac{dx_g}{dt}(n)\right|^2 + \left|\frac{dy_g}{dt}(n)\right|^2 + \left|\frac{dz_g}{dt}z(n)\right|^2\right)$$

$$\frac{1}{N}\sum_{n=0}^{N-1}\sqrt{\left|\frac{dx_b}{dt}(n)\right|^2 + \left|\frac{dy_b}{dt}(n)\right|^2 + \left|\frac{dz_g}{dt}(n)\right|^2}$$

It is important to note that the 15 predetermined features in Table 1 are invariant under arbitrary rotation θ in the xz-plane. That is, the UAR system 100 is not adversely impacted by an arbitrary holding position and/or orientation of a smartphone (or sensor platform) because after gravity alignment rotation has been performed, the only ambiguity relates to the amount of rotation of the acceleration sensor around the y-axis (that is, rotation in the xz-plane). Thus, feature values determined by the module 104 that are invariant under arbitrary rotation in the xz-plane are independent of the initial position and/or orientation of the accelerometer sensor 120.

The feature normalization module 105 normalizes the feature values to be with a specified range from minimum to maximum based on training data. In one embodiment, the feature values could be normalized in range [−1,+1]. In another embodiment, the feature values could be normalized in range [0,+1].

The ML classifier module 106 uses the normalized feature values to classify the measured activity into one of a plurality of example activities. In one embodiment, the ML classifier module 106 classifies the normalized feature values into a still activity, a walking activity, a running activity, a driving activity, a tilting activity, or a bicycling activity. In another embodiment, other activities may be recognized and classified. ML classifier module 106 may run on different platforms, such as, but not limited to, a Python-based sk learn platform or a Waikato Environment for Knowledge Analysis (WEKA) platform. The ML classifier module 106 may use machine learning classifiers, such as, but not limited to, Naïve Bayes (NB), Decision Tree (DT), Support Vector Machine (SVM), Logistic Regression (LR), Forests of Random Tree (FRT), One-vs-the-rest based on SVM, k-nearest neighbors (KNN), or Perceptron.

In one embodiment, the output of the ML classifier module 106 may be used directly as the classification output 130. In another embodiment, such as depicted in FIG. 1, UAR performance may be further improved by inputting the output of the ML classifier 106 into a log probabilities smoothing module 107. In one embodiment, smoothing of the logarithm of the probability output from ML classifier module 106 may be provided by using log (p (n_s, k)) to represent the logarithm of the probability of an activity k for segment n_s so that the smoothing output y(n_s, k) on activity k for segment n_s is:

$$y(n_s,k)=0.2 \cdot \log(p(n_s,k))+0.8 \cdot y(n_s-1,k).$$

Classification for segment n_s after smoothing operation may be $$C(n_s)=\text{argmax}_k y(n_s,k), k \in \{1,2,\ldots,K\}.$$

UAR classification performance may be further improved by inputting the output of the log probabilities smoothing module 107 into the isolated misdetection elimination module 108. In one embodiment, the isolated misdetection elimination module 108 uses a temporal property of activity transition that users will not change activity within T segments. That is, if a classified activity lasts for less than T segments, then the classified activity would be determined to be a misdetection. The value of T may be set according to a required system sensitivity. In one embodiment, a value may be used of T=2, which corresponds to about 2.56 seconds.

After identifying an isolated misdetection period, the detected activity may be corrected during the misdetection period based on the past activity $k_p$ and an immediately subsequent activity (i.e., a future activity) $k_f$ as: if the past activity $k_p$ and future activity $k_f$ match, set the misdetected activity is set in the misdetection period to be activity $k_p$=Otherwise, an additional comparison may be needed that may be based on the average classification probability calculated in misdetection period for activity class $k_p$ versus activity class $k_f$, respectively denoted as $\bar{p}(k_p)$ and $\bar{p}(k_f)$: if $\bar{p}(k_p) > \bar{p}(k_f)$, the activity in the misdetection period is set to be activity $k_p$; otherwise, the activity in the misdetection period is set to be activity $k_f$.

The average probability $\bar{p}(k_p)$ for the activity class $k_p$ and the average probability $\bar{p}(k_f)$ for the activity class $k_f$ may be calculated as the average probability in the misdetection period $\mathcal{M}$ for class $k_p$ versus class $k_f$ as:

$$\bar{p}(k_p) = \frac{1}{|\mathcal{M}|} \sum_{n_s \in \mathcal{M}} \exp(y(n_s, k_p)), \text{ and}$$

$$\bar{p}(k_f) = \frac{1}{|\mathcal{M}|} \sum_{n_s \in \mathcal{M}} \exp(y(n_s, k_f)),$$

in which $y(n_s, k)$ denotes the log probability after a smoothing operation for segment $n_s$ to be classified as class k. In one embodiment, the output of the isolated misdetection elimination module 108 may be the classification output 130.

Figure 4:
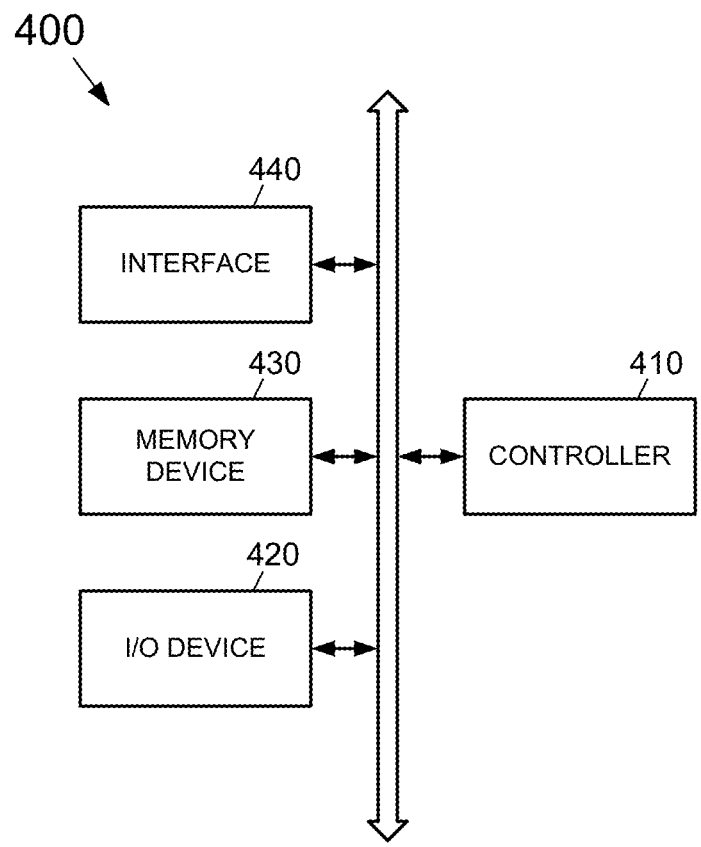
FIG. 4 depicts an electronic device that comprises one or more integrated circuits (chips) comprising a UAR system to recognize user activity according to the subject matter disclosed herein.

FIG. 4 depicts an electronic device 400 that comprises one or more integrated circuits (chips) comprising a UAR system to recognize user activity according to the subject matter disclosed herein. Electronic device 400 may be used in, but not limited to, a computing device, a personal digital assistant (PDA), a laptop computer, a mobile computer, a web tablet, a wireless phone, a cell phone, a smart phone, a digital music player, or a wireline or wireless electronic device. The electronic device 400 may comprise a controller 410, an input/output device 420 such as, but not limited to, a keypad, a keyboard, a display, or a touch-screen display, a memory 430, and a wireless interface 440 that are coupled to each other through a bus 450. The controller 410 may comprise, for example, at least one microprocessor, at least one digital signal process, at least one microcontroller, or the like. The memory 430 may be configured to store a command code to be used by the controller 410 or a user data. Electronic device 400 and the various system components comprising electronic device 400 may comprise a UAR system to recognize user activity according to the subject matter disclosed herein. The electronic device 400 may use a wireless interface 440 configured to transmit data to or receive data from a wireless communication network using a RF signal. The wireless interface 440 may include, for example, an antenna, a wireless transceiver and so on. The electronic system 400 may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service—Time Division Duplex (UMTS-TDD), High Speed Packet Access (HSPA), Evolution Data Optimized (EVDO), Long Term Evolution-Advanced (LTE-Advanced), Multi-channel Multipoint Distribution Service (MMDS), and so forth.

Figure 5:
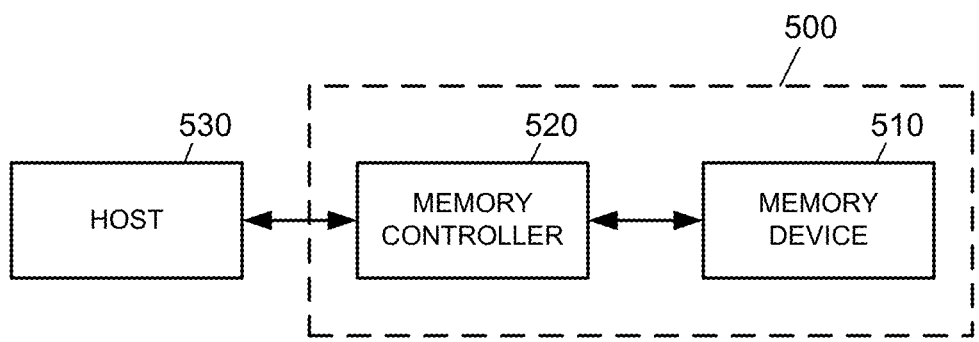
FIG. 5 depicts a memory system that may comprise a UAR system to recognize user activity according to the subject matter disclosed herein.

FIG. 5 depicts a memory system 500 that may comprise a UAR system to recognize user activity according to the subject matter disclosed herein. The memory system 500 may comprise a memory device 510 for storing large amounts of data and a memory controller 520. The memory controller 520 controls the memory device 510 to read data stored in the memory device 510 or to write data into the memory device 510 in response to a read/write request of a host 530. The memory controller 520 may include an address-mapping table for mapping an address provided from the host 530 (e.g., a mobile device or a computer system) into a physical address of the memory device 510. The memory device 510 may comprise one or more semiconductor devices comprising a UAR system to recognize user activity according to the subject matter disclosed herein.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. A user activity recognizer, comprising:
   a filter to form a gravity measurement from a three-dimensional (3D) accelerometer measurement of a user activity received from a 3D accelerometer sensor platform, the 3D accelerometer measurement being segmented and each segment comprising N samples, the filter comprising:
      a first delay that receives a first segment of the 3D accelerometer measurement and outputs a delayed first segment of the 3D accelerometer measurement that has been delayed by one segment from the first segment;
      a first summer that sums the first segment of the 3D accelerometer measurement with a first intermediate gravity measurement to form the gravity measurement;
      a second delay that receives the gravity measurement and outputs a delayed gravity measurement that has been delayed by one segment from the gravity measurement; and
      a second summer that receives the delayed first segment and the delayed gravity measurement and outputs the first intermediate gravity measurement; and
   a processor configured to:
      remove the gravity measurement from the 3D accelerometer measurement to form a body measurement of the user activity; and
      rotate the gravity measurement to align with a predetermined direction using a rotation matrix R.

2. The user activity recognizer according to claim 1, wherein the processor is further configured to classify the accelerometer measurement of the user activity as one of a predetermined number of activities based on values of a predetermined number of features of the user activity.

3. The user activity recognizer according to claim 1, wherein the processor is further configured to determine values of a predetermined number of features of the user activity based on the 3D accelerometer measurement and the body measurement based on the rotation matrix R, the predetermined number of features being invariant under arbitrary rotation of the accelerometer measurement around the predetermined direction.

4. The user activity recognizer according to claim 3, wherein the filter further comprises:
a first scaler that scales the delayed first segment by 52/64; and
a second scaler that scales the delayed gravity measurement by 63/64, and
wherein the gravity measurement comprises:

$$G_x(n) = \frac{x(n) + \frac{52}{64}x(n-1) + \frac{63}{64}G_x(n-1)}{N}$$

$$G_y(n) = \frac{y(n) + \frac{52}{64}y(n-1) + \frac{63}{64}G_y(n-1)}{N}$$

$$G_z(n) = \frac{z(n) + \frac{52}{64}z(n-1) + \frac{63}{64}G_z(n-1)}{N}$$

wherein $G_x(n)$ is a component of gravity in an x-axis direction of the accelerometer sensor platform, $G_y(n)$ is a component of gravity in a y-axis direction of the accelerometer sensor platform, $G_z(n)$ is a component of gravity in a z-axis direction of the accelerometer sensor platform, $x(n)$ is an accelerometer measurement in the x-axis direction, $y(n)$ is an accelerometer measurement in the y-axis direction, $z(n)$ is an accelerometer measurement in the z-axis direction, n is a sample index in which n=1, 2, . . . , N, and N is a total number of samples in the segment.

5. The user activity recognizer according to claim 4, wherein the predetermined direction is in a negative y-axis direction of the accelerometer sensor platform.

6. The user activity recognizer according to claim 5, wherein the accelerometer sensor platform is part of a smartphone.

7. The user activity recognizer according to claim 5, wherein the processor is configured to rotate an average of the gravity measurement to substantially align with the negative y-axis direction of the accelerometer sensor platform using the rotation matrix R, wherein $$\begin{bmatrix} 0 \\ -\sqrt{\overline{G_x}^2 + \overline{G_y}^2 + \overline{G_z}^2} \\ 0 \end{bmatrix} = R \begin{bmatrix} \overline{G_x} \\ \overline{G_y} \\ \overline{G_z} \end{bmatrix}, \text{ and}$$

$$\overline{G_x} = \frac{1}{N}\sum_{n=1}^{N} G_x(n), \overline{G_y} = \frac{1}{N}\sum_{n=1}^{N} G_y(n), \overline{G_z} = \frac{1}{N}\sum_{n=1}^{N} G_z(n),$$

wherein the rotation matrix R comprises $$R = \begin{bmatrix} \cos(\psi) & \sin(\psi) & 0 \\ -\cos(\varphi)\sin(\psi) & \cos(\varphi)\cos(\psi) & \sin(\varphi) \\ \sin(\varphi)\sin(\psi) & -\sin(\varphi)\cos(\psi) & \cos(\varphi) \end{bmatrix},$$

and
wherein $\psi$ is a rotation angle around a z-axis of the accelerometer sensor platform and $\varphi$ is a rotation angle around an x-axis of the accelerometer sensor platform.

8. The user activity recognizer according to claim 7, wherein $$\psi = \frac{\pi}{2} + \text{atan2}(\overline{G_y}, \overline{G_x}),$$

$$\varphi = \frac{\pi}{2} + \text{atan2}(-\overline{G_x}\cdot\sin(\psi) + \overline{G_y}\cdot\cos(\psi), -\overline{G_z}), \text{ and}$$

wherein $$\text{atan2}(y, x) = \begin{cases} \arctan\left(\frac{y}{x}\right), & \text{if } x > 0 \\ \arctan\left(\frac{y}{x}\right) + \pi, & \text{if } x < 0 \text{ and } y \geq 0 \\ \arctan\left(\frac{y}{x}\right) - \pi, & \text{if } x < 0 \text{ and } y < 0 \\ +\frac{\pi}{2}, & \text{if } x = 0 \text{ and } y > 0 \\ -\frac{\pi}{2}, & \text{if } x = 0 \text{ and } y < 0 \\ \text{undefined}, & \text{if } x = 0 \text{ and } y = 0 \end{cases}.$$

9. The user activity recognizer according to claim 8, wherein components of the body measurement are determined as $$\begin{bmatrix} x_b(n) \\ y_b(n) \\ z_b(n) \end{bmatrix} = \begin{bmatrix} x_g(n) \\ y_g(n) \\ z_g(n) \end{bmatrix} - R\begin{bmatrix} G_x(n) \\ G_y(n) \\ G_z(n) \end{bmatrix} = R\left(\begin{bmatrix} x(n) \\ y(n) \\ z(n) \end{bmatrix} - \begin{bmatrix} G_x(n) \\ G_y(n) \\ G_z(n) \end{bmatrix}\right)$$

wherein $x_b(n)$ is a component of the body measurement in the x-axis direction, $y_b(n)$ is a component of the body measurement in the y-axis direction, $z_b(n)$ is a component of the body measurement in the z-axis direction, $x_g(n)$ is a component of the 3D accelerometer measurement in an x-axis direction, $y_g(n)$ is a component of the 3D accelerometer measurement in a y-axis direction, and $z_g(n)$ is a component of the 3D accelerometer measurement in a z-axis direction.

10. The user activity recognizer according to claim 9, wherein the processor is further configured to classify the accelerometer measurement of the user activity as one of a predetermined number of activities based on the values of the predetermined number of features.

11. A method to recognize user activity, the method comprising:
filtering a three-dimensional (3D) accelerometer measurement of a user activity to form a gravity measurement, the 3D accelerometer measurement being received from a 3D accelerometer sensor platform, the 3D accelerometer measurement being segmented and each segment comprising N samples, the filter comprising:
a first delay that receives a first segment of the 3D accelerometer measurement and outputs a delayed first segment of the 3D accelerometer measurement that has been delayed by one segment from the first segment;
a first summer that sums the first segment of the 3D accelerometer measurement with a first intermediate gravity measurement to form the gravity measurement;

a second delay that receives the gravity measurement and outputs a delayed gravity measurement that has been delayed by one segment from the gravity measurement; and a second summer that receives the delayed first segment and the delayed gravity measurement and outputs the first intermediate gravity measurement;

removing by a processor the gravity measurement from the 3D accelerometer measurement to form a body measurement of the user activity; and rotating and aligning by the processor the gravity measurement with a predetermined direction using a rotation matrix R.

12. The method according to claim 11, further comprising classifying by the processor the accelerometer measurement of the user activity as one of a predetermined number of activities based on values of a predetermined number of features of the user activity.

13. The method according to claim 12, further comprising determining values of a predetermined number of features of the user activity by the processor based on the 3D accelerometer measurement and the body measurement based on the rotation matrix R, the predetermined number of features being invariant under arbitrary rotation of the accelerometer measurement around the predetermined direction.

14. The method according to claim 13, wherein the gravity measurement comprises:

$$G_x(n) = \frac{x(n) + \frac{52}{64}x(n-1) + \frac{63}{64}G_x(n-1)}{N}$$

$$G_y(n) = \frac{y(n) + \frac{52}{64}y(n-1) + \frac{63}{64}G_y(n-1)}{N}$$

$$G_z(n) = \frac{z(n) + \frac{52}{64}z(n-1) + \frac{63}{64}G_z(n-1)}{N}$$

wherein $G_x(n)$ is a component of gravity in an x-axis direction of the accelerometer sensor platform, $G_y(n)$ is a component of gravity in a y-axis direction of the accelerometer sensor platform, $G_z(n)$ is a component of gravity in a z-axis direction of the accelerometer sensor platform, $x(n)$ is an accelerometer measurement in the x-axis direction, $y(n)$ is an accelerometer measurement in the y-axis direction, $z(n)$ is an accelerometer measurement in the z-axis direction, n is a sample index in which n=1, 2, . . . , N, and N is a total number of samples in the segment.

15. The method according to claim 14, wherein the predetermined direction is in a negative y-axis direction of the accelerometer sensor platform.

16. The method according to claim 15, wherein the accelerometer sensor platform is part of a smartphone.

17. The method according to claim 15, further comprising rotating by the processor an average of the gravity measurement to substantially align with the negative y-axis direction of the accelerometer sensor platform using the rotation matrix R, wherein $$\begin{bmatrix} 0 \\ -\sqrt{\overline{G_x}^2 + \overline{G_y}^2 + \overline{G_z}^2} \\ 0 \end{bmatrix} = R \begin{bmatrix} \overline{G_x} \\ \overline{G_y} \\ \overline{G_z} \end{bmatrix}, \text{ and}$$

$$\overline{G_x} = \frac{1}{N}\sum_{n=1}^{N} G_x(n), \overline{G_y} = \frac{1}{N}\sum_{n=1}^{N} G_y(n), \overline{G_z} = \frac{1}{N}\sum_{n=1}^{N} G_z(n),$$

wherein the rotation matrix R comprises $$R = \begin{bmatrix} \cos(\psi) & \sin(\psi) & 0 \\ -\cos(\varphi)\sin(\psi) & \cos(\varphi)\cos(\psi) & \sin(\varphi) \\ \sin(\varphi)\sin(\psi) & -\sin(\varphi)\cos(\psi) & \cos(\varphi) \end{bmatrix},$$

and wherein $\psi$ is a rotation angle around a z-axis of the accelerometer sensor platform and $\varphi$ is a rotation angle around an x-axis of the accelerometer sensor platform.

18. The method according to claim 17, wherein $$\psi = \frac{\pi}{2} + \text{atan2}(\overline{G_y}, \overline{G_x}),$$

$$\phi = \frac{\pi}{2} + \text{atan2}(-\overline{G_x} \cdot \sin(\psi) + \overline{G_y} \cdot \cos(\psi), -\overline{G_z}), \text{ and}$$

wherein $$\text{atan2}(y, x) = \begin{cases} \arctan\left(\frac{y}{x}\right), & \text{if } x > 0 \\ \arctan\left(\frac{y}{x}\right) + \pi, & \text{if } x < 0 \text{ and } y \geq 0 \\ \arctan\left(\frac{y}{x}\right) - \pi, & \text{if } x < 0 \text{ and } y < 0 \\ +\frac{\pi}{2}, & \text{if } x = 0 \text{ and } y > 0 \\ -\frac{\pi}{2}, & \text{if } x = 0 \text{ and } y < 0 \\ \text{undefined}, & \text{if } x = 0 \text{ and } y = 0 \end{cases}.$$

19. The method according to claim 18, further comprising determining components of the body measurement by the processor as $$\begin{bmatrix} x_b(n) \\ y_b(n) \\ z_b(n) \end{bmatrix} = \begin{bmatrix} x_g(n) \\ y_g(n) \\ z_g(n) \end{bmatrix} - R\begin{bmatrix} G_x(n) \\ G_y(n) \\ G_z(n) \end{bmatrix} = R\left(\begin{bmatrix} x(n) \\ y(n) \\ z(n) \end{bmatrix} - \begin{bmatrix} G_x(n) \\ G_y(n) \\ G_z(n) \end{bmatrix}\right)$$

wherein $x_b(n)$ is a component of the body measurement in the x-axis direction, $y_b(n)$ is a component of the body measurement in the y-axis direction, $z_b(n)$ is a component of the body measurement in the z-axis direction, $x_g(n)$ is a component of the 3D accelerometer measurement in an x-axis direction, $y_g(n)$ is a component of the 3D accelerometer measurement in a y-axis direction, and $z_g(n)$ is a component of the 3D accelerometer measurement in a z-axis direction.

20. The method to claim 19, further comprising classifying the accelerometer measurement of the user activity by the processor as one of a predetermined number of activities based on the values of the predetermined number of features.

* * * * *